US011025555B2

(12) United States Patent
Li et al.

(10) Patent No.: US 11,025,555 B2
(45) Date of Patent: Jun. 1, 2021

(54) METHOD FOR PROCESSING DATA AND DEVICE

(71) Applicant: Huawei Technologies Co., Ltd., Shenzhen (CN)

(72) Inventors: Xiaoxian Li, Shenzhen (CN); Ping Fang, Shenzhen (CN); Yong Cheng, Shenzhen (CN); Gaokun Pang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/633,398

(22) PCT Filed: Sep. 7, 2018

(86) PCT No.: PCT/CN2018/104549
§ 371 (c)(1),
(2) Date: Jan. 23, 2020

(87) PCT Pub. No.: WO2019/047912
PCT Pub. Date: Mar. 14, 2019

(65) Prior Publication Data
US 2020/0374237 A1 Nov. 26, 2020

(30) Foreign Application Priority Data

Sep. 8, 2017 (CN) .......................... 201710803613.2
Sep. 30, 2017 (CN) .......................... 201710940143.4

(51) Int. Cl.
*H04W 28/02* (2009.01)
*H04L 12/801* (2013.01)
(Continued)

(52) U.S. Cl.
CPC .......... *H04L 47/34* (2013.01); *H04L 67/2852* (2013.01); *H04L 69/22* (2013.01); *H04W 28/0252* (2013.01)

(58) Field of Classification Search
CPC ......... H04L 47/10; H04L 47/34; H04L 67/28; H04L 67/2804; H04L 67/2819;
(Continued)

(56) References Cited

U.S. PATENT DOCUMENTS 10,785,668 B2 * 9/2020 Kim ...................... H04W 24/10
2002/0089994 A1 * 7/2002 Leach, Jr. ............... H04L 47/10
370/412

(Continued)

FOREIGN PATENT DOCUMENTS

CN 101841853 A 9/2010
CN 104426638 A 3/2015
(Continued)

OTHER PUBLICATIONS

Machine Translation and Abstract of Chinese Publication No. CN104426638, Mar. 18, 2015, 18 pages.
(Continued)

*Primary Examiner* — Kevin D Mew
(74) *Attorney, Agent, or Firm* — Conley Rose, P.C.

(57) ABSTRACT

A method includes obtaining a first count value of a first protocol data unit, delivering a service data unit corresponding to a second value set in a first value set to an upper layer protocol stack, and deleting a fourth value set from a third value set when the first count value matches a second count value, where the first value set includes a count value corresponding to a protocol data unit, delivered in-order, in a receiving buffer of a wireless device, the third value set includes a count value corresponding to a protocol data unit that has been delivered by the wireless device to the upper
(Continued)

layer protocol stack out-of-order, and a fifth value set including the second value set and the fourth value set is a continuous count value section for which counting starts from the first count value.

20 Claims, 7 Drawing Sheets

(51) Int. Cl.
*H04L 29/08* (2006.01)
*H04L 29/06* (2006.01)

(58) Field of Classification Search
CPC ............ H04L 67/2823; H04L 67/2842; H04L 67/2852; H04L 69/22; H04L 69/321; H04L 69/322; H04W 28/02; H04W 28/0252
See application file for complete search history.

(56) References Cited

U.S. PATENT DOCUMENTS

| | | | |
|---|---|---|---|
| 2003/0128705 A1* | 7/2003 | Yi ..................... | H04W 52/143 370/394 |
| 2010/0232356 A1* | 9/2010 | Maheshwari ....... | H04W 12/037 370/328 |
| 2011/0286416 A1 | 11/2011 | Wang et al. | |
| 2015/0326456 A1 | 11/2015 | Dudda et al. | |
| 2016/0241685 A1* | 8/2016 | Shah ..................... | H04L 69/40 |
| 2017/0085492 A1 | 3/2017 | Xiao et al. | |
| 2017/0238195 A1 | 8/2017 | Hao et al. | |

FOREIGN PATENT DOCUMENTS

| | | |
|---|---|---|
| CN | 104519524 A | 4/2015 |
| CN | 104935413 A | 9/2015 |
| CN | 105451210 A | 3/2016 |
| EP | 3070975 A1 | 9/2016 |

OTHER PUBLICATIONS

Machine Translation and Abstract of Chinese Publication No. CN104519524, Apr. 15, 2015, 30 pages.
Nokia, et al., "De-activation of re-ordering in PDCP," R2-1707194, 3GPP TSG-RAN WG2 NR Adhoc #2, Qingdao, China, Jun. 27-29, 2017, 5 pages.
Oppo et al., "TP on out-of-sequence delivery from PDCP," XP051317672, R2-1707711, 3GPP TSG-RAN2 Meeting #99, Berlin, Germany, Aug. 21-25, 2017, 4 pages.
Qualcomm Inc "Out-of-order delivery in PDCP receive operation," XP051318189, R2-1708293, 3GPP TSG-RAN WG2 Meeting#99, Berlin, Germany, Aug. 21-25, 2017, 4 pages.
LG Electronics Inc., "Support for out-of-order delivery in PDCP," XP051318891, R2-1709098, 3GPP TSG-RAN WG2 #99, Berlin, Germany, Aug. 21-Aug. 25, 2017, 5 pages.
7 Lg Electronics Inc, "Support for out-of-order delivery in Pdcp," XP051330415, R2-1709872, 3GPP Tsg-Ran.
LG Electronics Inc, "E-mail discussion summary of PDCP receive operation," R2-1706869, 3GPP TSG-RAN WG2 NR AdHoc, Qingdao, China, Jun. 27-29, 2017, 28 pages.
Nokia, et al., "De-activation of re-ordering in PDCP," XP051301688, R2-1707194, 3GPP TSG-RAN WG2 NR Adhoc #2, Qingdao, China, Jun. 27-29, 2017, 5 pages.
Huawei, "PDCP reordering disabling and enabling," R2-1707252, 3GPP TSG-RAN WG2 Ad Hoc, Qingdao, China, Jun. 27-29, 2017, 3 pages.

* cited by examiner

METHOD FOR PROCESSING DATA AND DEVICE

CROSS-REFERENCE TO RELATED APPLICATION

This application is a national stage application of International Application No. PCT/CN2018/104549, filed on Sep. 7, 2018, which claims priority to Chinese Patent Application No. 201710803613.2, filed on Sep. 8, 2017 and Chinese Patent Application No. 201710940143.4, filed on Sep. 30, 2017. All of the aforementioned applications are hereby incorporated by reference in their entireties.

TECHNICAL FIELD

This application relates to the communication field, and more specifically, to a method for processing data and a device.

BACKGROUND

A 5th generation (5th Generation, 5G) mobile communications technology (mobile communication technology) is an extension of a 4th generation (the 4 Generation, 4G) mobile communications technology. An existing evolved universal terrestrial radio access network (Evolved Universal Terrestrial Radio Access Network, E-UTRAN) standard supports dual connectivity (Dual Connectivity, DC), to be specific, in an RRC_CONNECTED connected state. UE on which a plurality of Rxs/Txs are configured may use radio resources scheduled by two eNodeBs eNBs, where the two eNBs are connected to each other through non-ideal backhaul (non-ideal backhaul) on an X2 interface. In the two eNBs, one serves as a master eNB (Master eNB, MeNB), and the other serves as a secondary eNB (Secondary eNB, SeNB). In DC, a receiver device performs data processing including operations such as decryption, integrity check, and reordering at a packet data convergence protocol (Packet Data Convergence Protocol, PDCP) layer after receiving data.

In an original LTE standard, a data radio bearer (Data Radio Bearer, DRB) is corresponding to a PDCP entity (or referred to as a PDCP layer), and the PDCP layer reorders a received PDCP protocol data unit (PDCP Protocol Data Unit, PDCP PDU) and delivers a PDCP SDU in the PDCP PDU to an upper protocol stack. This transmission mechanism is referred to as in-order transmission (In-Order Delivery, or referred to as in-order delivery). In a 3GPP discussion about NR, it has been determined that a PDCP layer may not reorder a received PDCP PDU in some cases, but directly delivers data to an upper protocol stack, that is, an out-of-order transmission mechanism (Out-of-Order Delivery), or referred to as out-of-order delivery, is used. In the prior art, there is no solution for a case in which both a PDCP PDU delivered in order and a PDCP PDU delivered out of order exist in a data radio bearer (or a PDCP entity).

SUMMARY

This application provides a method for processing data and a device, to provide a solution for a case in which both a PDCP PDU delivered in order and a PDCP PDU delivered out of order exist in a data radio bearer (or a PDCP entity).

According to a first aspect, a method for processing data is provided, where the method is applied to a wireless device, and the method includes:

receiving a first protocol data unit;
obtaining a first count value of the first protocol data unit; and
if the first count value matches a second count value maintained by the wireless device,
delivering a service data unit corresponding to a second value set in a first value set to an upper layer protocol stack, and deleting a fourth value set from a third value set, where the first value set includes a count value of a service data unit that is corresponding to a protocol data unit delivered in order and that the wireless device receives and stores in a receiving buffer; the third value set includes a count value, recorded by the wireless device, of a service data unit that is corresponding to a protocol data unit delivered out of order and that the wireless device receives and has delivered to the upper layer protocol stack; and a fifth value set including the second value set and the fourth value set is a continuous count value section for which counting starts from the first count value.

In some possible implementations, the wireless device performs any one of the foregoing implementations by using a packet data convergence protocol PDCP layer of the wireless device, and the first protocol data unit is a PDCP packet data unit PDU.

The foregoing method may be a process performed by the wireless device such as UE or a network device at the PDCP layer of the wireless device.

In the foregoing process, when both a PDCP PDU delivered in order in-order delivery and a PDCP PDU delivered out of order out-of-order delivery exist in a data radio bearer (Data Radio Bearer, DRB), during data packet receiving and when the PDCP layer performs delivery processing for the upper layer protocol stack, COUNT values of the two types of PDCP PDUs are considered, thereby ensuring uniformity between a receive operation (Receive Operation) specific to the DRB and a receive operation specific to a DRB in which there is only a PDCP PDU transmitted through in-order delivery, and improving data processing compatibility of the wireless device.

In some possible implementations, the second count value is a larger one of a count value of a service data unit, corresponding to the last protocol data unit delivered in order, delivered by the wireless device to the upper layer protocol stack and a maximum value of count values, deleted by the wireless device, of service data units corresponding to protocol data units delivered out of order, where that the first count value matches a second count value maintained by the wireless device is specifically:
the first count value is equal to the second count value plus 1.

Specifically, the second count value is a count value of a service data unit, corresponding to the last protocol data unit delivered in order, delivered by the wireless device to the upper layer protocol stack, or the second count value is a maximum value of count values, deleted by the wireless device, of service data units corresponding to protocol data units delivered out of order.

According to the foregoing process, when a COUNT value of a received PDCP PDU is a status variable RX_DELIV+1 maintained by the wireless device, operations of delivering, to the upper layer protocol stack, a stored PDCP SDU corresponding to a PDCP PDU transmitted through in-order delivery (a structure of a PDCP PDU includes a header header part and a PDCP SDU) and deleting a recorded COUNT value of a PDCP PDU transmitted through out-of-order delivery are started.

In some possible implementations, the obtaining a first count value of the first protocol data unit includes:

determining the first count value based on a sequence number SN of the first protocol data unit and a hyper frame number HFN of the first protocol data unit.

The COUNT value of the PDCP PDU is determined according to the foregoing process.

In some possible implementations, after the delivering a service data unit corresponding to a second value set in a first value set to an upper layer protocol stack, and deleting a fourth value set from a third value set, the method further includes:

updating the second count value to a maximum value of the fifth value set.

The status variable RX_DELIV is updated according to the foregoing process.

In some possible implementations, after the receiving a first protocol data unit, the method further includes:

if the first protocol data unit is a protocol data unit delivered in order, storing a service data unit corresponding the first protocol data unit to the receiving buffer; or if the first protocol data unit is a protocol data unit delivered out of order, delivering a service data unit corresponding to the first protocol data unit to the upper layer protocol stack, and recording the first count value.

According to the foregoing process, the wireless device may determine to perform different operation processes on a PDCP PDU transmitted through in-order delivery and a PDCP PDU transmitted through out-of-order delivery.

According to a second aspect, a method for processing data is provided, where the method is applied to a wireless device, and the method includes:

if a first timer expires and the first tinier is started by the wireless device after the wireless device receives a protocol data unit whose count value is a first count value, performing the following steps:

delivering, to an upper layer protocol stack (upper layer), a stored service data unit corresponding to a protocol data unit whose count value is less than the first count value and that is delivered in order;

deleting a recorded count value, less than the first count value, of a service data unit that is corresponding to a protocol data unit delivered out of order and that has been delivered to the upper layer protocol stack;

delivering a service data unit corresponding to a second value set in a first value set to the upper layer protocol stack, and deleting a fourth value set from a third value set, where the first value set includes a count value of a service data unit that is corresponding to a protocol data unit delivered in order and that the wireless device receives and stores in a receiving buffer; the third value set includes a count value, recorded by the wireless device, of a service data unit that is corresponding to a protocol data unit delivered out of order and that the wireless device receives and has delivered to the upper layer protocol stack; and a fifth value set including the second value set and the fourth value set is a continuous count value section for which counting starts from the first count value.

Optionally, the first timer is a timer t-reordering.

In the foregoing process, an operation of the timer t-reordering during expiration expiration is defined. In this process, when both a PDCP PDU delivered in order in-order delivery and a PDCP PDU delivered out of order out-of-order delivery exist in a data radio bearer (Data Radio Bearer, DRB), during data packet receiving and when a PDCP layer performs delivery processing for the upper layer protocol stack, COUNT values of the two types of PDCP PDUs are considered, thereby ensuring uniformity between a receive operation (Receive Operation) specific to the DRB and a receive operation specific to a DRB in which there is only a PDCP PDU transmitted through in-order delivery, and improving data processing compatibility of the wireless device.

In some possible implementations, after the delivering a service data unit corresponding to a second value set in a first value set to the upper layer protocol stack, and deleting a fourth value set from a third value set, the method further includes:

updating a second count value maintained on the wireless device to a maximum value of the fifth value set, where the second count value is a larger one of a count value of a service data unit, corresponding to the last protocol data unit delivered in order, delivered by the wireless device to the upper layer protocol stack and a maximum value of count values, deleted by the wireless device, of service data units corresponding to protocol data units delivered out of order.

Specifically, the second count value is a count value of a service data unit, corresponding to the last protocol data unit delivered in order, delivered by the wireless device to the upper layer protocol stack, or the second count value is a maximum value of count values, deleted by the wireless device, of service data units corresponding to protocol data units delivered out of order.

A status variable RX_DELIV is updated according to the foregoing process.

In some possible implementations, the wireless device performs any one of the foregoing implementations by using a PDCP layer of the wireless device, and the protocol data unit is a PDCP packet data unit PDU.

The foregoing method may be a process performed by the wireless device such as UE or a network device at the PDCP layer of the wireless device.

According to a third aspect, a wireless device is provided, and is configured to perform the method in the first aspect or any possible implementation of the first aspect. Specifically, the wireless device includes modules configured to perform the method in the foregoing first aspect or any possible implementation of the first aspect, and is specifically as follows:

10. A wireless device, including:
a receiving module, configured to receive a first protocol data unit; and
a processing module, configured to obtain a first count value of the first protocol data unit, where
the processing module is further configured to: if the first count value matches a second count value maintained by the wireless device, deliver a service data unit corresponding to a second value set in a first value set to an upper layer protocol stack, and delete a fourth value set from a third value set, where the first value set includes a count value of a service data unit that is corresponding to a protocol data unit delivered in order and that the wireless device receives and stores in a receiving buffer; the third value set includes a count value, recorded by the wireless device, of a service data unit that is corresponding to a protocol data unit delivered out of order and that the wireless device receives and has delivered to the upper layer protocol stack; and a fifth value set including the second value set and the fourth value set is a continuous count value section for which counting starts from the first count value.

11. The wireless device according to Embodiment 10, where the second count value is a larger one of a count value of a service data unit, corresponding to the last protocol data unit delivered in order, delivered by the wireless device to the upper layer protocol stack and a maximum value of count values, deleted by the wireless device, of service data units corresponding to protocol data units delivered out of order, where that the first count value matches a second count value maintained by the wireless device includes:

the first count value is equal to the second count value plus 1.

12. The wireless device according to Embodiment 10 or 11, where the processing module is specifically configured to:

determine the first count value based on a sequence number SN of the first protocol data unit and a hyper frame number HFN of the first protocol data unit.

13. The wireless device according to any one of Embodiments 10 to 12, where after delivering the service data unit corresponding to the second value set in the first value set to the upper layer protocol stack, and deleting the fourth value set from the third value set, the processing module is further configured to:

update the second count value to a maximum value of the fifth value set.

14. The wireless device according to any one of Embodiments 10 to 13, where after receiving the first protocol data unit, the processing module is further configured to:

if the first protocol data unit is a protocol data unit delivered in order, store a service data unit corresponding the first protocol data unit to the receiving buffer; or if the first protocol data unit is a protocol data unit delivered out of order, deliver a service data unit corresponding to the first protocol data unit to the upper layer protocol stack, and record the first count value.

15. The wireless device according to any one of Embodiments 10 to 14, where the wireless device performs a step, described in any one of Embodiments 10 to 14, performed by a packet data convergence protocol PDCP layer of the wireless device, and the first protocol data unit is a PDCP packet data unit PDU.

According to a fourth aspect, a wireless device is provided, and is configured to perform the method in the foregoing second aspect or any possible implementation of the second aspect. Specifically, the wireless device includes modules configured to perform the method in the foregoing second aspect or any possible implementation of the second aspect, and is specifically as follows:

16. A wireless device, including:

a processing module, configured to perform the following steps if a first timer expires and the first timer is started by the wireless device after the wireless device receives a protocol data unit whose count value is a first count value:

delivering, to an upper layer protocol stack, a stored service data unit corresponding to a protocol data unit whose count value is less than the first count value and that is delivered in order;

deleting a recorded count value, less than the first count value, of a service data unit that is corresponding to a protocol data unit delivered out of order and that has been delivered to the upper layer protocol stack;

delivering a service data unit corresponding to a second value set in a first value set to the upper layer protocol stack, and deleting a fourth value set from a third value set, where the first value set includes a count value of a service data unit that is corresponding to a protocol data unit delivered in order and that the wireless device receives and stores in a receiving buffer; the third value set includes a count value, recorded by the wireless device, of a service data unit that is corresponding to a protocol data unit delivered out of order and that the wireless device receives and has delivered to the upper layer protocol stack; and a fifth value set including the second value set and the fourth value set is a continuous count value section for which counting starts from the first count value.

17. The wireless device according to Embodiment 16, where after delivering the service data unit corresponding to the second value set in the first value set to the upper layer protocol stack, and deleting the fourth value set from the third value set, the processing module is further configured to:

update a second count value maintained on the wireless device to a maximum value of the fifth value set, where the second count value is a larger one of a count value of a service data unit, corresponding to the last protocol data unit delivered in order, delivered by the wireless device to the upper layer protocol stack and a maximum value of count values, deleted by the wireless device, of service data units corresponding to protocol data units delivered out of order.

18. The wireless device according to Embodiment 16 or 17, where the wireless device performs the step described in Embodiment 16 or 17 by using a packet data convergence protocol PDCP layer of the wireless device, and the protocol data unit is a PDCP packet data unit PDU.

According to a fifth aspect, a wireless device is provided, where the wireless device includes a processor, a memory, and a transceiver. The processor is connected to the memory and the transceiver. The memory is configured to store an instruction; the processor is configured to execute the instruction; and the transceiver is configured to communicate with another network element under control of the processor. When the processor executes the instruction stored in the memory, the processor is enabled to perform the method in the first aspect or any possible implementation of the first aspect.

According to a sixth aspect, a wireless device is provided, where the wireless device includes a processor, a memory, and a transceiver. The processor is connected to the memory and the transceiver. The memory is configured to store an instruction; the processor is configured to execute the instruction; and the transceiver is configured to communicate with another network element wider control of the processor. When the processor executes the instruction stored in the memory, the processor is enabled to perform the method in the second aspect or any possible implementation of the second aspect.

According to a seventh aspect, a computer readable storage medium is provided, where a program is stored in the computer readable storage medium, and the program enables a wireless device to perform the method for processing data in the foregoing first aspect and any one of the implementations of the first aspect.

According to an eighth aspect, a computer readable storage medium is provided, where a program is stored in the computer readable storage medium, and the program enables a wireless device to perform the method for processing data in the foregoing second aspect and any one of the implementations of the second aspect.

According to a ninth aspect, a chip is provided, including a processing module and a communications interface, where the processing module is configured to perform the method for processing data in the foregoing first aspect and any one of the implementations of the first aspect.

In some possible implementations, the chip further includes a storage module, where the storage module is configured to store an instruction; the processing module is configured to call the instruction stored in the storage module; and calling the instruction stored in the storage module enables the processing module to perform the method for processing data in the foregoing first aspect and any one of the implementations of the first aspect.

According to a tenth aspect, a chip is provided, including a processing module and a communications interface, where the processing module is configured to perform the method for processing data in the foregoing second aspect and any one of the implementations of the second aspect.

In some possible implementations, the chip further includes a storage module, where the storage module is configured to store an instruction; the processing module is configured to call the instruction stored in the storage module; and calling the instruction stored in the storage module enables the processing module to perform the method for processing data in the foregoing second aspect and any one of the implementations of the second aspect.

According to an eleventh aspect, a computer program product including an instruction is provided, where when the computer program product is run on a computer, the computer is enabled to perform the method in the foregoing first aspect, the foregoing second aspect, or any possible implementation of the first aspect and the second aspect.

According to a twelfth aspect, a wireless device comprising a processor, a memory, and a transceiver is provided. The transceiver is configured to receive and send data. The memory is configured to store an instruction. The processor is configured to call the instruction stored in the memory to perform any of the foregoing implementations of the first aspect.

According to a thirteenth aspect, a computer program product comprising a computer program is provided. When the computer program is executed in a computer, the computer is enabled to implement any of the foregoing implementations of the first aspect.

According to a fourteenth aspect, a computer program is provided. When the computer program is executed in a computer, the computer is enabled to implement any of the foregoing implementations of the first aspect.

According to a fifteenth aspect, a computer readable storage medium is provided. A computer program is stored in the computer readable storage medium, and when the computer program is executed in a computer, the computer is enabled to implement any of the foregoing implementations of the first aspect.

It should be understood that, there is no specific correspondence between numbers of embodiments provided above and numbers of the following embodiments, and the numbers of the embodiments provided above are used only for the convenience of expression of this part.

DESCRIPTION OF EMBODIMENTS

The following describes technical solutions of this application with reference to accompanying drawings.

Figure 1:
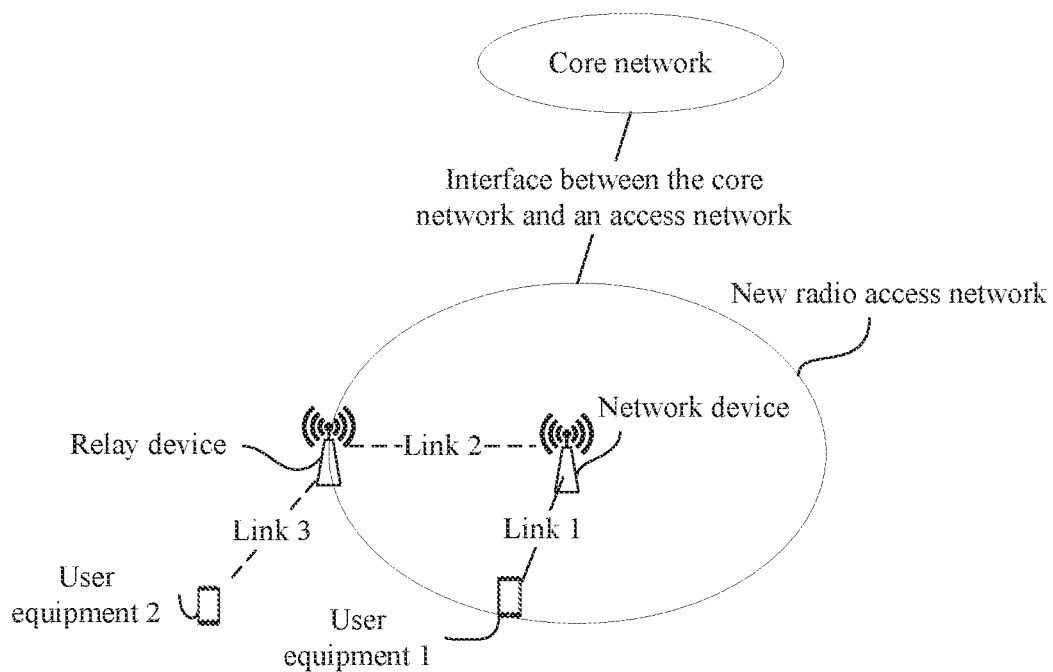
FIG. 1 is a schematic diagram of a scenario to which an embodiment of this application is applied.

The technical solutions in the embodiments of this application may be applied to a wireless communications system such as a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS), a worldwide interoperability for microwave access (Worldwide Interoperability for Microwave Access, WiMAX) communications system, a future fifth generation (5th Generation, 5G) system or new radio (New Radio, NR), an LTE next generation scenario, a wireless local area network (Wireless Local Area Network, WLAN) scenario, bluetooth communication, and a communications system defined by the third generation partnership project (3rd Generation Partnership Project, 3GPP). For ease of description, a new radio scenario is used as an example for description in the embodiments of this application. FIG. 1 is a schematic diagram of a scenario to which an embodiment of this application is applied. As shown in FIG. 1, in a new radio scenario, a core network such as NGC/5GC or an EPC, and a new radio access network may be included. For ease of description, in this embodiment of this application, the core network such as NGC/5GC or an EPC and the new radio access network are uniformly referred to as a core network and an access network in this embodiment of this application. Functional entities in the new radio scenario are mainly a network device and user equipment that is connected to a network device in the new radio access network, for example, user equipment 1 shown in FIG. 1. Optionally, the functional entities may further include a relay device and user equipment connected to the relay device, for example, user equipment 2 shown in FIG. 1. The relay device establishes a connection to the network device through a link 2, and therefore relative to the network device, the relay device may also be regarded as user equipment. The relay device establishes a connection to the user equipment 2 through a link 3, and therefore relative to the user equipment, the relay device may also be regarded as a network device. Therefore, a person skilled in the art can understand that, the network device described in this embodiment of this application may also include a relay device and the user equipment described in this embodiment of this application may also include a relay device. The network device may be specifically a gNB, a new radio eNodeB (New radio eNB), a transmission and reception point (Transmission And Reception Point, TRP), a macro base station, a micro base station, a high frequency base station, and a wireless controller in a cloud radio access network (Cloud Radio Access Network, CRAN) scenario. Alternatively, the network device may be any one or a combination of some of the following: a relay node, an access point, an in-vehicle device, a wearable device, a network device in a future 5G network, a network device in a future evolved PLMN network, an LTE macro or micro eNB, customer-premises equipment (Customer-premises equipment, CPE), a WLAN access point (Access Point, AP), and a WLAN group owner (Group owner, GO), or the like. For example, the network device may be a gNB, and the gNB completes a function of the network device in this embodiment of this application. Alternatively, the network device may be a combination of a gNB and a TRP. For example, the gNB completes a resource configuration function of the network device in this embodiment of this application, the TRP completes sending and receiving functions of the network device in this embodiment of this application. This embodiment of this application is not limited thereto.

The user equipment UE in this embodiment of this application may be a mobile phone, a tablet computer, an intelligent vehicle, a sensor device, an IOT device, CPE, a relay base station, a terminal device, an access terminal, a subscriber unit, a subscriber station, a mobile station, a mobile console, a remote station, a remote terminal, a mobile device, a user terminal, a terminal, a wireless communications device, a user agent, a user apparatus, or the like. The user equipment may alternatively be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device and a computing device having a wireless communication function, another processing device connected to a wireless modem, an in-vehicle device, a wearable device, a terminal device in a future 5G network, a terminal device in a future evolved public land mobile network (Public Land Mobile Network, PLMN), or the like. This is not limited in this embodiment of this application.

A 5G communications system is referred to as a "beyond 4G network", a "post long term evolution LTE system", or "new radio NR". In LTE or NR, after establishing a radio resource control (Radio Resource Control, RRC) connection to a base station, UE further establishes a bearer (bearer) such as a signal radio bearer (Signaling Radio Bearer, SRB) or a data radio bearer (Data Radio Bearer, DRB). When being applied to a dual connectivity structure, a DRB may be any one of a master cell group (Master Cell Group, MCG) bearer, a secondary cell group (Secondary Cell Group, SCG) bearer, an MCG split bearer (split bearer), and an SCG split bearer.

Figure 2:
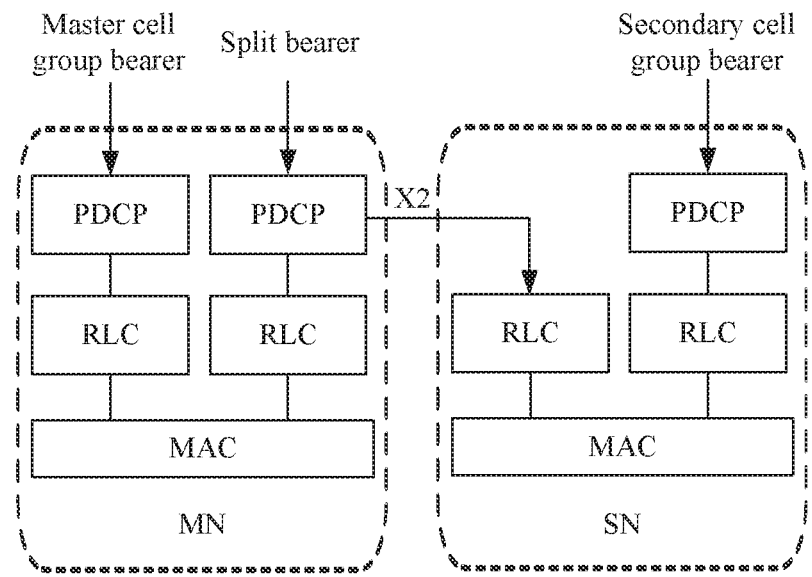
FIG. 2 is a schematic architecture diagram of a wireless protocol stack for dual connectivity.

In a single connectivity scenario, a corresponding protocol stack is established inside each of UE and a base station for each DRB. FIG. 2 is a schematic architecture diagram of a wireless protocol stack for dual connectivity DC. As shown in FIG. 2, the protocol stack includes at least a packet data convergence protocol (Packet Data Convergence Protocol, PDCP) layer, a radio link control (Radio Link Control, RLC) layer, and a medium access control (Medium Access Control, MAC) layer. A PDCP layer of a master network node (Master Node, MN) is connected to an RLC layer of a secondary network node (Secondary Node, SN) through an X2 interface. In NR, a service data adaptation protocol (Service Data Adaptation Protocol, SDAP) layer may be further included. Each layer of the protocol stack is corresponding to a corresponding functional entity. For example, a functional entity corresponding to the PDCP layer is a PDCP entity, and so on. The PDCP layer processes a radio resource control RRC message on a control plane, an interact protocol (Internet Protocol, IP) packet on a user plane, and the like. On the user plane, after obtaining an IP data packet from an upper layer, the PDCP layer performs header compression and encryption on a PDCP service data unit (Service Data Unit, SDU) of the IP data packet, adds a PDCP header (header) to form a PDCP protocol data unit (Protocol Data Unit, PDU), and then delivers the PDCP PDU to the RLC layer. The PDCP layer further provides an in-order delivery function and a repeated packet detection function for the upper layer. In this case, a PDCP head of each PDCP PDU includes a sequence number (Sequence Number, SN). In different connectivity scenarios, quantities of various functional entities included in the protocol stack are different. For example, in a dual connectivity (Dual Connectivity, DC) scenario, two RLC entities and two MAC entities are established for each DRB on a UE side. In LTE, for a specific bearer (bearer) in a DC scenario, three different types of bearers may be established: an MCG bearer, an SCG bearer, and a split bearer (split bearer)

In NR, in multi-radio access technology dual connectivity (Multi-RAT Dual Connectivity, MR-DC), different multi-connectivity types are defined, for example, E-UTRA-NR dual connectivity (E-UTRA-NR Dual Connectivity, EN-DC), NGEN-DC dual connectivity (NG-RAN E-UTRA-NR Dual Connectivity, NGEN-DC), and NE dual connectivity (NR-E-UTRA Dual Connectivity, NE-DC); and four bearer types are defined: an MCG bearer, an SCG bearer, an MCG split bearer, and an SCG split bearer. A DRB may be configured to one of the four types.

Figure 3:
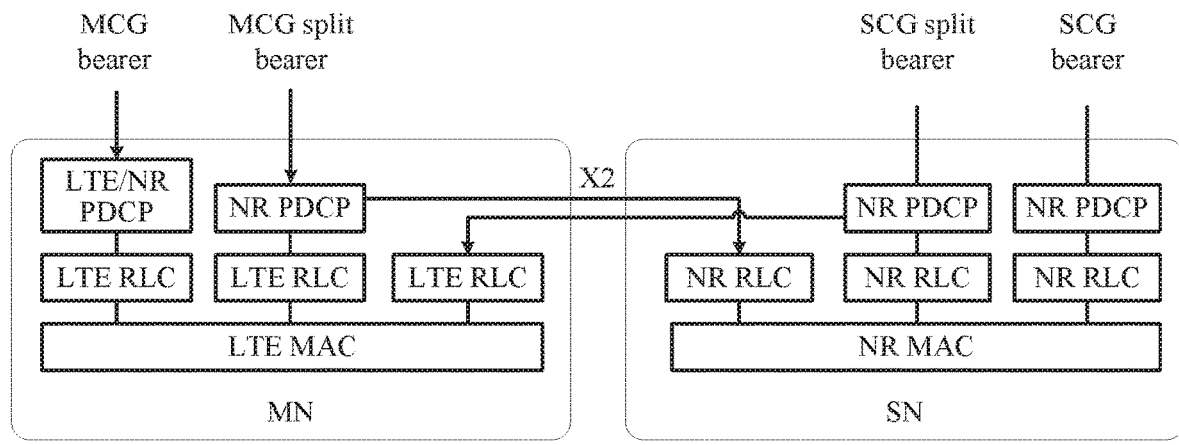
FIG. 3 is an architecture diagram of a wireless protocol for dual connectivity.

FIG. 3 shows a wireless protocol architecture of four types of bearers in an EN-DC scenario. Bearer types corresponding to an MN include an MCG bearer and an MCG split bearer, and bearer types corresponding to an SN include an SCG bearer and an SCG split bearer. The MN includes an LTE/NR PDCP layer, an NR PDCP layer, an LTE RLC layer, and an LTE MAC layer. The SN includes an NR PDCP layer, an NR RLC layer, and an NR MAC layer. The NR PDCP layer of the MN is connected to the NR RLC layer of the SN through an X2 interface. The LTE RLC layer of the MN is connected to the NR PDCP layer of the SN through an X2 interface.

Figure 4:
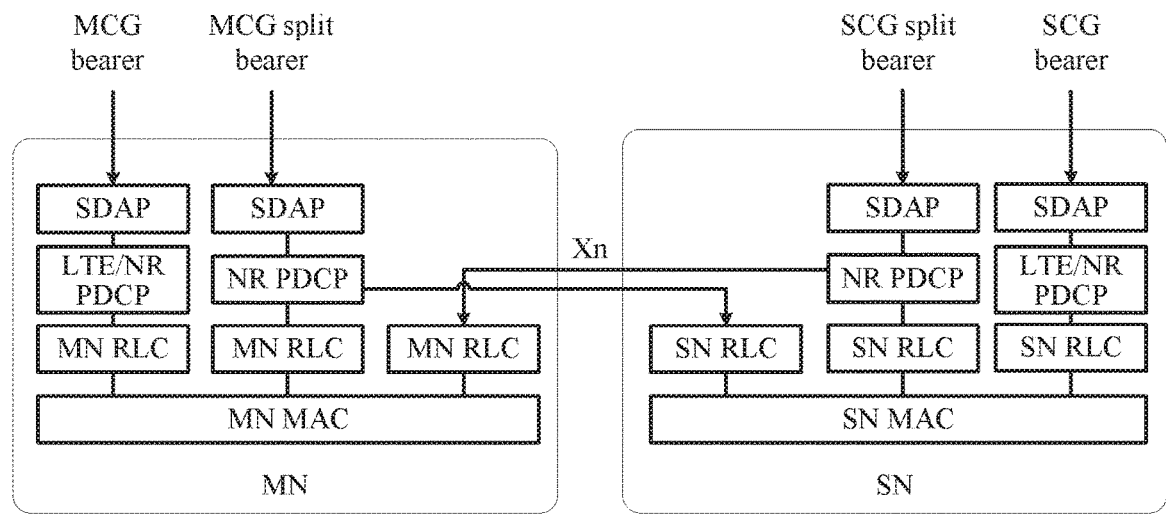
FIG. 4 is another architecture diagram of a wireless protocol for dual connectivity.

FIG. 4 shows a wireless protocol architecture of four types of bearers in an NGEN-DC scenario and an NE-DC scenario. Bearer types corresponding to an MN include an MCG bearer and an MCG split bearer, and bearer types corresponding to an SN include an SCG bearer and an SCG split bearer. The MN includes an SDAP layer, an LTE/NR PDCP layer, an NR PDCP layer, an MN RLC layer, and an MN MAC layer. The SN includes an SDAP layer, an NR PDCP layer, an LTE/NR PDCP layer, an SN RLC layer, and an SN MAC layer. The NR PDCP layer of the MN is connected to the SN RLC layer of the SN through an Xn interface. The MN RLC layer of the MN is connected to the NR PDCP layer of the SN through an X2 interface.

In various DRBs, a receiver device performs data processing at a PDCP layer after receiving data, for example, decryption, integrity check, and reordering. In an original LTE standard, the PDCP layer reorders a received PDCP protocol data unit and delivers a PDCP SDU in the PDCP PDU to an upper protocol stack upper layer. This PDCP PDU delivery mechanism is referred to as in-order delivery in-order delivery. In a 3GPP discussion about NR, it has been determined that a PDCP layer may not reorder a received PDCP PDU in some cases. When data arrives, the data is no longer stored in a buffer of the PDCP layer, but is directly delivered to an upper protocol stack for processing, so as to reduce a delay of a data link. This PDCP PDU delivery mechanism is referred to as out-of-order delivery out-of-order delivery.

A granularity of existing out-of-order delivery is each DRB, that is, delivery of PDCP PDUs of the entire DRB is out-of-order delivery. However, in some cases, in a DRB, both a PDCP PDU transmitted through in-order delivery and a PDCP PDU transmitted through out-of-order delivery exist. For example, in a quality of service (Quality of Service, QoS) flow flow applied to web browsing possibly includes a transmission control protocol (Transmission Control Protocol, TCP) flow, a user datagram protocol (User Datagram Protocol, UDP) packet, and a real-time transport protocol (Real-time Transport Protocol, RTP) flow, where the RTP flow further includes an RTP data packet and an RTP control packet. The TCP flow and the RTP data packet occupy a relatively large ratio, and therefore the QoS flow may be configured in a DRB in which in-order delivery is performed. However, some UDP packets (such as DNS requests) or RTP control packets need to be transmitted to a corresponding processing unit of a peer end at a relatively low delay. If these packets also need to be temporarily stored at a PDCP layer and conform to a delivery rule of reordering, these packets are affected by some lost TCP data packets or RTP data packets, causing a relatively large reordering delay. As a result, user experience is affected.

It should be noted that, a radio bearer (bearer) is not specifically limited in the solutions provided in the embodiments of this application. The solutions not only can be applicable to a data radio bearer DRB, but also can be applicable to a signal radio bearer SRB. Specifically, when both a PDCP PDU transmitted through in-order delivery and a PDCP PDU transmitted through out-of-order delivery exist in an SRB, for an operation of receiving the PDCP PDUs, reference may also be made to the solutions provided in the embodiments of this application.

In view of the foregoing problem, an embodiment of this application provides a processing mechanism for a DRB in which both a PDCP PDU transmitted through in-order delivery and a PDCP PDU transmitted through out-of-order delivery exist.

Figure 5:
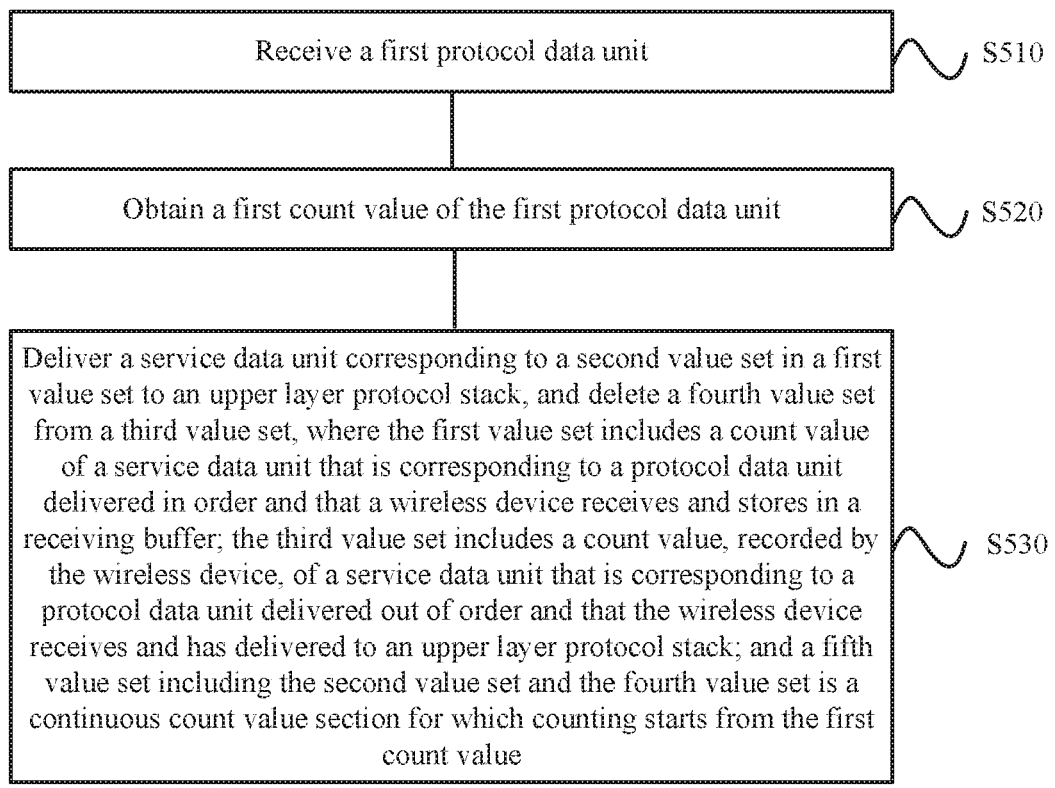
FIG. 5 is a schematic flowchart of a method for processing data according to an embodiment of this application.

FIG. 5 is a schematic flowchart of a method 500 for processing data according to an embodiment of this application. The method 500 may be performed by a wireless device, and the wireless device may be the user equipment UE or the network device described above. Optionally, the wireless device may be a receiving device in a new radio scenario. As shown in FIG. 5, the method 500 includes the following steps:

S510. Receive a first protocol data unit.

Figure 6:
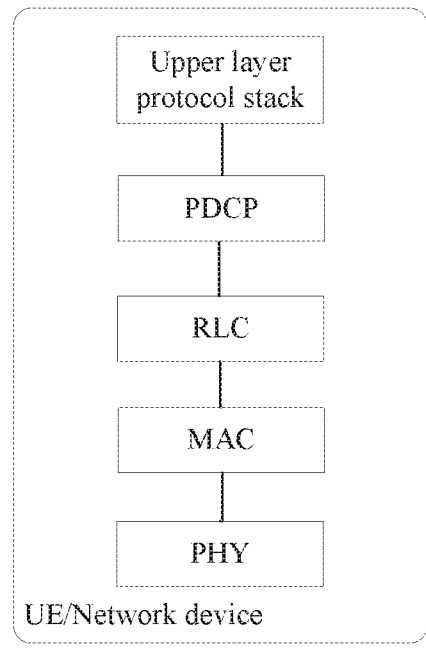
FIG. 6 is a schematic diagram of a protocol stack according to an embodiment of this application.

Optionally, the first protocol data unit may be a PDCP PDU. For ease of description, herein, that the wireless device is UE is used as an example for description. For each DRB, a corresponding PDCP entity is established inside the UE. For different connectivity structures, an RLC entity and a MAC entity have different configurations. For example, when the solution is applied to a DC scenario, the UE respectively establishes an RLC entity and a MAC entity for an MN and an SN; and when the solution is applied to PDCP duplication transmission in a CA scenario, corresponding RLC entities are established for different CCs, and these RLC entities are connected to a same MAC entity. FIG. 6 is a schematic diagram of a protocol stack according to an embodiment of this application. As shown in FIG. 6, the protocol stack includes, from top to bottom, an upper layer protocol stack, a PDCP layer, an RLC layer, a MAC layer, and a PHY layer in sequence. It should be understood that, the protocol stack in FIG. 6 is applicable to a data receiving process performed by UE or a network device. In FIG. 6, an RLC entity and a MAC entity are used as an example for description, but this does not limit this embodiment of this application.

Specifically, after receiving a wireless message from the PHY layer, the UE delivers a data packet at the PHY layer to the MAC layer after performing corresponding processing at the PHY layer, delivers a processed data packet to the RLC layer after performing corresponding processing at the MAC layer, and delivers a processed data packet to the PDCP layer after performing corresponding processing at the RLC layer, so as to obtain a PDCP PDU.

It should be noted that, if the foregoing execution body is a network device, a first protocol data unit received by the network device may be received by using a receiver, or may be forwarded (may be forwarded in a wired or wireless manner) to the wireless device after being received by a receiver in a device other than the wireless device. For example, the wireless device is a CU, a PDCP PDU received by the CU is forwarded through an F1 interface after being received by the DU.

Further, after receiving the foregoing PDCP PDU, the UE first determines, at the PDCP layer, whether the PDCP PDU is a PDU transmitted through in-order delivery or a PDU transmitted through out-of-order delivery.

Optionally, the UE may perform the determining by using indication information of a header header part of the PDCP PDU. For example, the UE performs the determining by using a value of a corresponding field of the header part. For example, the PDU is indicated by setting a 1-bit bit I/O (In-Order or Out-of-Order) field in the header part. When I/O=1, it indicates that the PDU is a packet transmitted through in-order delivery; and when I/O=0, it indicates that the PDU is a packet transmitted through out-of-order delivery. It should be understood that, only example description about a bit value corresponding to indication information is provided herein, and does not limit the protection scope of the embodiments of this application.

Optionally, the UE may perform the determining by using indication information in an SDU corresponding to the PDCP PDU. For example, the UE performs the determining by using indication information in an SDAP header of the SDU. For example, the UE performs the determining by using a QoS flow ID, a session ID, or a field (such as an I/O field) specially used to indicate in-order delivery or out-of-order delivery in the SDAP header of the SDU.

Optionally, the UE may perform the determining by receiving an indication message from a sender device. For example, when the sender device needs to send a PDCP PDU transmitted through out-of-order delivery, the sender device first provides an indication to the UE through a specific RRC message, a specific MAC CE, specific DCI, or the like. After receiving the indication message, the UE may determine that a subsequent PDCP PDU is a PDCP PDU transmitted through out-of-order delivery. Further, after completing sending of the PDCP PDU transmitted through out-of-order delivery, the sender device may send a specific RRC message, a specific MAC CE, specific DCI, or the like to the UE to indicate that sending of the PDCP PDU transmitted through out-of-order delivery is completed and that a subsequently sent PDCP PDU is a PDCP PDU transmitted through in-order delivery.

Optionally, the PDCP PDU further indicates an SN number of the PDCP PDU. The UE may determine a COUNT value of the PDCP PDU based on the SN number and a current hyper frame number (Hyper Frame Number, HFN) of the PDCP, and a possible calculation manner is COUNT=SN‖HFN, where a person skilled in the art may understand that "‖" represents a splicing operation.

S520. Obtain a first count value of the first protocol data unit.

Optionally, the first count value may be a COUNT value of a PDCP PDU.

The first count value may be directly obtained, or may be obtained through calculation, and this is not limited.

Optionally, S520 includes:

determining the first count value based on a sequence number SN of the first protocol data unit and a hyper frame number HFN of the first protocol data unit.

For example, after the PDCP layer of the UE receives a PDCP PDU from a lower layer protocol stack (such as an RLC layer), the UE determines a COUNT value corresponding to the PDCP PDU. Specifically, the UE determines the COUNT value of the PDCP PDU based on an SN number indicated in a header of the PDCP PDU and a current HFN number, and a possible calculation manner is COUNT=SN‖HFN.

Optionally, after S510, the method may further include:

if the first protocol data unit is a protocol data unit delivered in order, storing a service data unit corresponding the first protocol data unit to a receiving buffer; and if the first protocol data unit is a protocol data unit delivered in order, delivering a service data unit corresponding to the first protocol data unit to an upper layer protocol stack, and recording the first count value.

Specifically, if the PDCP PDU is a PDU transmitted through in-order delivery, a PDCP SDU obtained after the PDCP PDU is processed is stored in the receiving buffer. The receiving buffer may be specifically a receiving buffer of a PDCP layer. If the PDCP PDU is a PDU transmitted through out-of-order delivery, the PDCP SDU obtained after the PDCP PDU is processed is transmitted to the upper layer protocol stack (upper layer), and a COUNT value of the PDCP PDU is recorded.

It should be understood that, the upper layer protocol stack upper layer described in this embodiment of this application is an upper layer protocol stack relative to a PDCP layer, such as an SDAP layer, an IP layer, or an RRC layer, and this is not limited.

S530. If the first count value matches a second count value maintained by the wireless device, deliver a service data unit corresponding to a second value set in a first value set to an upper layer protocol stack, and delete a fourth value set from a third value set, where the first value set includes a count value of a service data unit that is corresponding to a protocol data unit delivered in order and that the wireless device receives and stores in a receiving buffer; the third value set includes a count value, recorded by the wireless device, of a service data unit that is corresponding to a protocol data unit delivered out of order and that the wireless device receives and has delivered to the upper layer protocol stack; and a fifth value set including the second value set and the fourth value set is a continuous count value section for which counting starts from the first count value.

Optionally, alternatively, the second count value is a larger one of a count value of a service data unit, corresponding to the last protocol data unit delivered in order, delivered by the wireless device to the upper layer protocol stack and a maximum value of count values, deleted by the wireless device, of service data units corresponding to protocol data units delivered out of order, where that the first count value matches a second count value maintained by the wireless device is specifically:

the first count value is equal to the second count value plus 1.

Specifically, the second count value may be a larger one of a count value of a service data unit, corresponding to the last protocol data unit delivered in order, delivered by the wireless device to the upper layer protocol stack, or the second count value may be a maximum value of count values, deleted by the wireless device, of service data units corresponding to protocol data units delivered out of order.

Specifically, the UE maintains a status variable RX_NEXT at the PDCP layer, where the RX_NEXT is used to indicate a COUNT value associated with a next PDCP SDU expected to be received, and RX_NEXT=a maximum COUNT value currently received+1. When COUNT>=RX_NEXT, RX_NEXT is updated to COUNT+1.

It should be understood that, in an actual application process, the foregoing status variable RX_NEXT may also have another name. Only RX_NEXT is used as an example to describe this embodiment of this application, and does not limit this embodiment of this application.

Specifically, the UE maintains a status variable RX_DELIV at the PDCP layer, where RX_DELIV is a count value, that is, the second count value, and it indicates a maximum value between a deleted COUNT value associated with a PDCP SDU that is corresponding to a PDCP PDU transmitted through out-of-order delivery and that has been delivered to the upper layer protocol stack and a COUNT value associated with a PDCP SDU that is corresponding to a PDCP PDU transmitted through in-order delivery and that has been delivered to the upper layer protocol stack. If the UE receives a PDCP PDU whose COUNT value satisfies COUNT=RX_DELIV+1, that is, the first count value matches the second count value maintained by the wireless device, for a continuous COUNT value section (that is, the fifth value set) including COUNT values starting from RX_DELIV+1 that are associated with PDCP SDUs that are corresponding to PDCP PDUs transmitted through in-order delivery and that are stored in a current receiving buffer (that is, the second value set), and a recorded COUNT value associated with a PDCP SDU that is corresponding to a PDCP PDU transmitted through out-of-order delivery and that is delivered to the upper layer protocol stack (that is, the fourth value set), the UE delivers, to the upper layer protocol stack, a temporarily stored PDCP SDU corresponding to a COUNT value in the fifth value set; and deletes all recorded COUNT values associated with PDCP SDUs that have been delivered to the upper layer protocol stack.

It should be understood that, in an actual application process, the foregoing status variable RX_DELIV may also have another name. Only RX_DELIV is used as an example to describe this embodiment of this application, and does not limit this embodiment of this application.

Optionally, after S530, the method 500 may further include:

updating the second count value to a maximum value of the fifth value set.

Further, the UE updates a value of RX_DELIV to a maximum value between the COUNT value associated with the PDCP SDU delivered to the upper layer protocol stack this time and the COUNT values deleted this time.

Therefore, in this embodiment of this application, the wireless device receives the first protocol data unit, determines the first count value of the first protocol data unit, and if the first count value matches the second count value maintained by the wireless device, delivers the service data unit corresponding to the second value set in the first value set to the upper layer protocol stack, and deletes the fourth value set from the third value set, where the first value set includes the count value of the service data unit that is corresponding to the protocol data unit delivered in order and that the wireless device receives and stores in the receiving buffer; the third value set includes the count value, recorded by the wireless device, of the service data unit that is corresponding to the protocol data unit delivered out of order and that the wireless device receives and has delivered to the upper layer protocol stack; and the fifth value set including the second value set and the fourth value set is a continuous count value section for which counting starts from the first count value. In this way, an operation of receiving both a protocol data unit delivered in order and a protocol data unit delivered out of order is implemented, so as to help to improve user experience.

Figure 7:
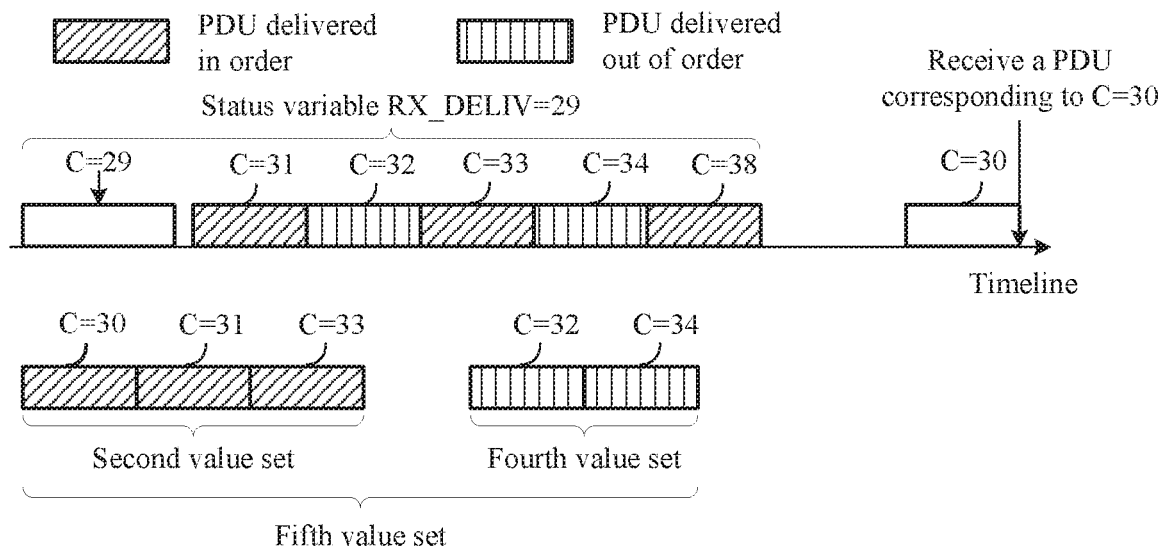
FIG. 7 is a schematic diagram of an example according to an embodiment of this application.

For ease of understanding the technical solutions in the embodiments of this application by a person skilled in the art, the following provides description with reference to an example in FIG. 7. It should be understood that, the example in FIG. 7 is only for ease of understanding the embodiments of this application by a person skilled in the art, and is not intended to limit the embodiments of this application to a specific scenario in the example. A person skilled in the art can apparently make various equivalent modifications or changes according to the example in FIG. 7, and such modifications or changes also fall within the scope of the embodiments of this application.

As shown in FIG. 7, a status variable maintained by UE is RX_DELIV=29, that is, corresponding to the second count value. Subsequently, the UE receives PDCP PDUs that are transmitted through in-order delivery and whose COUNT values are 31, 33, and 38 and receives PDCP PDUs that are transmitted through out-of-order delivery and whose COUNT values are 32 and 34. The UE stores, in the receiving buffer, SDUs corresponding to the PDCP PDUs transmitted through in-order delivery, delivers, to the upper layer protocol stack, SDUs corresponding to the PDCP PDUs transmitted through out-of-order delivery, and records the COUNT values corresponding to the SDUs, that is, 32 and 34. When the UE receives a PDCP PDU whose COUNT value is 30, the PDCP PDU satisfies this condition in which a COUNT value is RX_DELIV+1, and therefore regardless of whether the PDCP PDU is a PDCP PDU transmitted through in-order delivery or a PDCP PDU transmitted through out-of-order delivery, an operation process is triggered once. For ease of description, that the PDCP PDU is a PCDP PDU transmitted through in-order delivery is used as an example for description. According to the foregoing method, the UE stores, in the receiving buffer, an SDU corresponding to the PDCP PDU. The foregoing operation process is specifically as follows: For a continuous COUNT value section including COUNT values 30, 31, and 33 starting from RX_DELIV+1 that are corresponding to stored PDCP PDUs transmitted through in-order delivery (that is, corresponding to the second value set), and recorded COUNT values 32 and 34 corresponding to PDCP PDUs transmitted through out-of-order delivery (that is, the fourth value set), that is, the COUNT value section 30 to 34 starting from 30 shown in FIG. 7 (that is, corresponding to the fifth value set), the UE delivers, to the upper layer protocol stack, stored SDUs that are corresponding to PDCP PDUs transmitted through in-order delivery, that is, PDCP SDUs corresponding to the COUNT values 30, 31, and 33 shown in FIG. 7; and deletes recorded COUNT values that are corresponding to PDCP PDUs transmitted through out-of-order delivery, that is, 32 and 34 shown in FIG. 7. Finally, the UE updates a value of RX_DELIV to a maximum value, that is, 34, of the COUNT value section processed this time, that is, updates the second count value to a maximum value of the fifth value set.

Therefore, in the method for processing data in this embodiment of this application, COUNT values of a PDCP PDU transmitted through in-order delivery and a PDCP PDU transmitted through out-of-order delivery are considered, so as to implement an operation of receiving, by a PDCP layer of a receiver device, both a PDCP PDU transmitted through in-order delivery and a PDCP PDU transmitted through out-of-order delivery.

Figure 8:
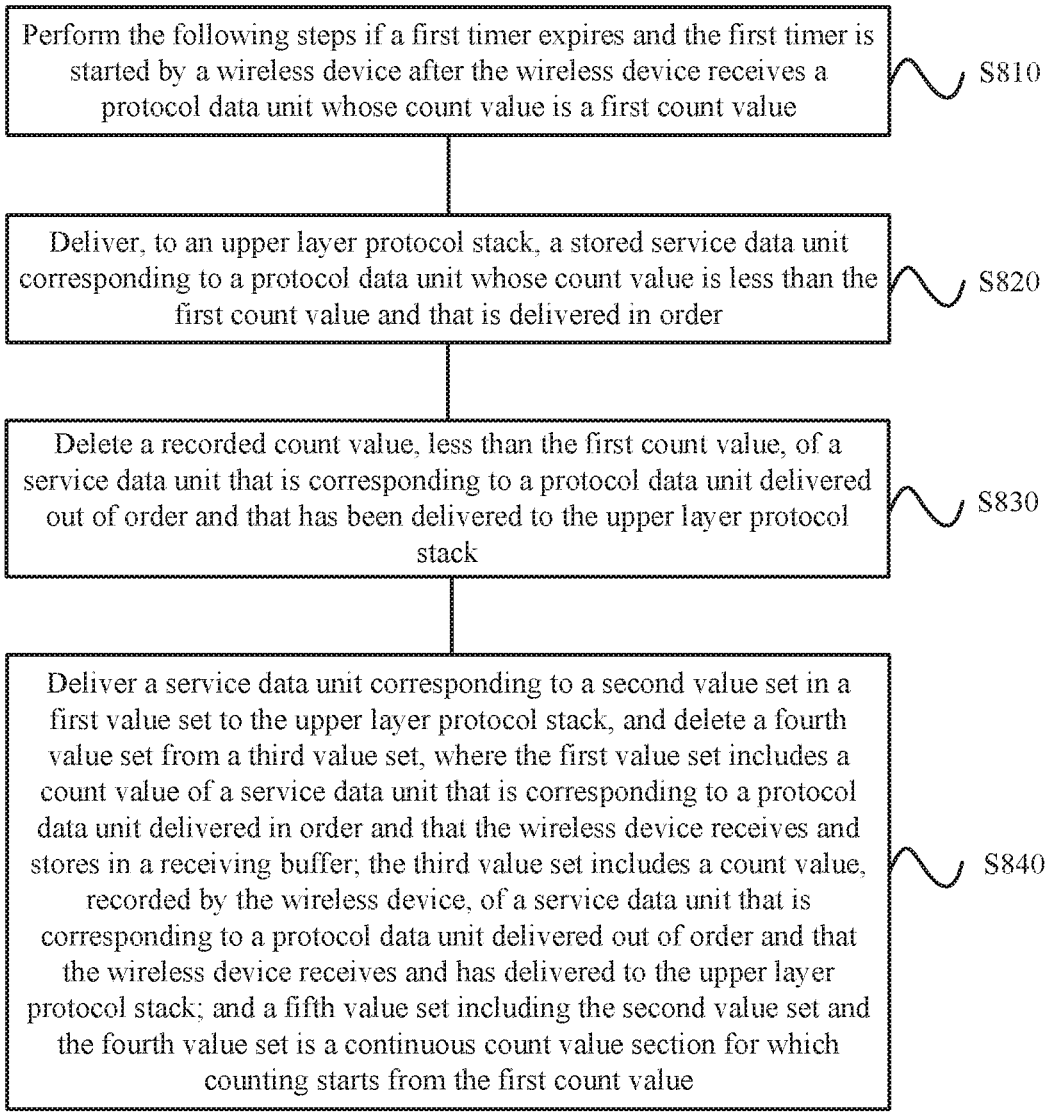
FIG. 8 is a schematic flowchart of a method for processing data according to another embodiment of this application.

This application further provides another embodiment. FIG. 8 is a schematic flowchart of a method 800 for processing data according to the another embodiment of this application. As shown in FIG. 8, the method 800 includes the following steps:

S810. Perform the following steps if a first timer expires and the first timer is started by the wireless device after the wireless device receives a protocol data unit whose count value is a first count value:

Optionally, a value of the first timer may be configured by a network side, for example, may be configured by a network device or a core network, or may be determined by UE.

The UE is used as an example. The UE may maintain a timer such as a timer t-reordering. When the timer t-reordering is not run, once there is at least one PDCP SDU that is corresponding to a PDCP PDU transmitted through in-order delivery and that is stored in a receiving buffer or any recorded COUNT value associated with a PDCP SDU that is corresponding to a PDCP PDU transmitted through out-of-order delivery and that has been delivered to an upper layer protocol stack, the UE starts the timer t-reordering, and records a COUNT value for triggering the timer t-reordering as RX_REORD, that is, the first count value. During running of the timer t-reordering, if a PDCP SDU whose associated COUNT value is RX_REORD−1 is delivered to the upper layer protocol stack, or a recorded COUNT value whose value is RX_REORD−1 is deleted, the UE stops and resets the timer t-reordering. For example, in FIG. 7, a first count value section (that is, a section whose COUNT values are from 30 to 34) is processed, a PDCP SDU whose COUNT value is 38 is also stored in the receiving buffer, and in this case, the UE starts the timer t-reordering and records RX_REORD=38.

S820. Deliver, to an upper layer protocol stack, a stored service data unit corresponding to a protocol data unit whose count value is less than the first count value and that is delivered in order.

S830. Delete a recorded count value, less than the first count value, of a service data unit that is corresponding to a protocol data unit delivered out of order and that has been delivered to the upper layer protocol stack.

S840. Deliver a service data unit corresponding to a second value set in a first value set to the upper layer protocol stack, and delete a fourth value set from a third value set, where the first value set includes a count value of a service data unit that is corresponding to a protocol data unit delivered in order and that the wireless device receives and stores in a receiving buffer; the third value set includes a count value, recorded by the wireless device, of a service data unit that is corresponding to a protocol data unit delivered out of order and that the wireless device receives and has delivered to the upper layer protocol stack; and a fifth value set including the second value set and the fourth value set is a continuous count value section for which counting starts from the first count value.

Optionally, after S840, the method may further include: updating a second count value maintained on the wireless device to a maximum value of the fifth value set, where the second count value is a larger one of a count value of a service data unit, corresponding to the last protocol data unit delivered in order, delivered by the wireless device to the upper layer protocol stack and a maximum value of count values, deleted by the wireless device, of service data units corresponding to protocol data units delivered out of order.

Specifically, the second count value may be a count value of a service data unit, corresponding to the last protocol data unit delivered in order, delivered by the wireless device to the upper layer protocol stack, or the second count value may be a maximum value of count values, deleted by the wireless device, of service data units corresponding to protocol data units delivered out of order.

Specifically, if the timer t-reordering expires, the UE delivers, to the upper layer protocol stack, all stored PDCP SDUs that are corresponding to PDCP PDUs transmitted through in-order delivery and whose COUNT values are less than RX_REORD, and deletes a COUNT value, less than RX_REORD, in all recorded COUNT values associated with PDCP SDUs that are corresponding to PDCP PDUs transmitted through out-of-order delivery and that are delivered to the upper layer protocol stack. For a continuous count value section (that is, the fifth value set) including COUNT values starting from RX_REORD that are associated with PDCP SDUs that are corresponding to PDCP PDUs transmitted through in-order delivery and that are stored in a current receiving buffer (that is, the second value set), and a recorded COUNT value associated with a PDCP SDU that is corresponding to a PDCP PDU transmitted through out-of-order delivery and that is delivered to the upper layer protocol stack (that is, the fourth value set), the UE delivers, to the upper layer protocol stack, stored PDCP SDUs corresponding to all COUNT values in the fifth value set and PDCP PDUs transmitted through in-order delivery; and deletes all recorded COUNT values in the fifth value set that are associated with PDCP SDUs that are corresponding to PDCP PDUs transmitted through out-of-order delivery and that have been delivered to the upper layer protocol stack. Further, the UE may update a value of RX_DELIV to a maximum value between COUNT values associated with the PDCP SDUs delivered to the upper layer protocol stack this time and the COUNT values deleted this time.

Therefore, in this embodiment of this application, when determining that the first timer expires, the wireless device delivers, to the upper layer protocol stack, the stored service data unit corresponding to the protocol data unit whose count value is less than the first count value and that is delivered in order, deletes the recorded count value, less than the first count value, of the service data unit that is corresponding to the protocol data unit delivered out of order and that has been delivered to the upper layer protocol stack, delivers the service data unit corresponding to the second value set in the first value set to the upper layer protocol stack, and deletes the fourth value set from the third value set. In this way, when the timer expires, an operation of receiving both a protocol data unit delivered in order and a protocol data unit delivered out of order is implemented, so as to help to improve user experience.

It should be understood that, the foregoing method 800 may be performed in combination with the foregoing method 500, or may be separately implemented, and this is not limited in this embodiment of this application.

Figure 9:
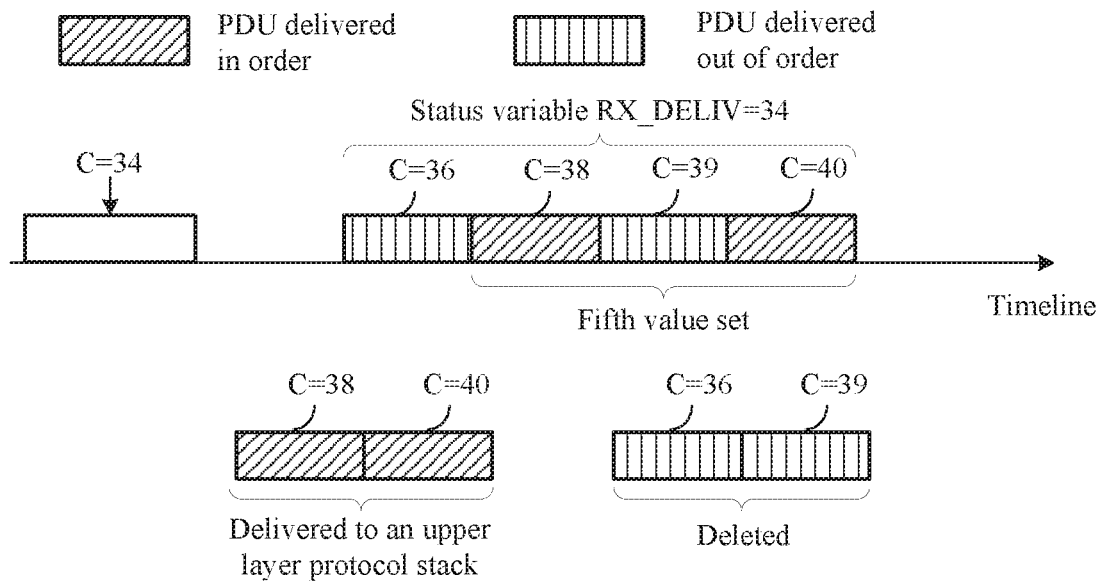
FIG. 9 is a schematic diagram of an example according to another embodiment of this application.

For ease of understanding the technical solutions in the embodiments of this application by a person skilled in the art, the following provides description with reference to an example in FIG. 9. It should be understood that, the example in FIG. 9 is only for ease of understanding the embodiments of this application by a person skilled in the art, and is not intended to limit the embodiments of this application to a specific scenario in the example. A person skilled in the art can apparently make various equivalent modifications or changes according to the example in FIG. 9, and such modifications or changes also fall within the scope of the embodiments of this application.

As shown in FIG. 9, a COUNT value for triggering a timer t-reordering is 38, that is, RX_REORD (corresponding to the first count value) is 38. After duration of the tinier t-reordering expires, UE still has not received a PDCP PDU whose COUNT value is RX_DELIV+1, the UE starts a receive operation once, where RX_DELIV is 34, and is corresponding the second count value. Specifically, for a section in Which a COUNT value is less than RX_REORD, the UE delivers, to the upper layer protocol stack, a stored SDU that is corresponding to a PDCP PDU transmitted through in-order delivery, and deletes a recorded. COUNT value corresponding to a PDCP PDU transmitted through out-of-order delivery. As shown in FIG. 9, if the UE does not store an SDU corresponding to a PDCP PDU transmitted through in-order delivery, the UE does not perform a corresponding operation, and the UE deletes a COUNT value 36. Further, for a continuous COUNT value section (corresponding to the fifth value set) including COUNT values starting from RX_REORD that are corresponding to stored PDCP PDUs transmitted through in-order delivery (corresponding to the second value set), and a recorded COUNT value corresponding to a PDCP PDU transmitted through out-of-order delivery (corresponding to the fourth value set), that is, the COUNT value section 38 to 40 starting from 38 shown in FIG. 9, the UE delivers, to the upper layer protocol stack, stored SDUs that are corresponding to PDCP PDUs transmitted through in-order delivery, that is, PDCP PDUs corresponding to the COUNT values 38 and 40 shown in FIG. 9; and deletes a recorded COUNT value that is corresponding to a PDCP PDU transmitted through out-of-order delivery, that is, 39 shown in FIG. 9. Finally, the UE updates a value of RX_DELIV to a maximum value of the COUNT value section processed this time, that is, 40.

Therefore, in the method for processing data in this embodiment of this application, when the timer t-reordering expires, COUNT values of a PDCP PDU transmitted through in-order delivery and a PDCP PDU transmitted through out-of-order delivery are considered, so as to implement a receive operation, performed by a PDCP layer of a receiver device, specific to a DRB in which both the PDCP PDU transmitted through in-order delivery and the PDCP PDU transmitted through out-of-order delivery exist.

It should be understood that, in this embodiment of this application, that a count value is described by using a COUNT value as an example. In an actual implementation process, the foregoing count value may be another count value such as an SN or an HFN, and this is not limited in this embodiment of this application.

Figure 10:
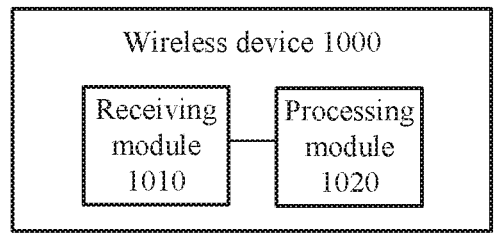
FIG. 10 is a schematic block diagram of a wireless device according to an embodiment of this application.
Figure 11:
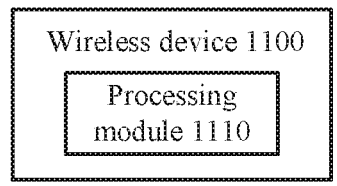
FIG. 11 is a schematic block diagram of a wireless device according to another embodiment of this application.
Figure 12:
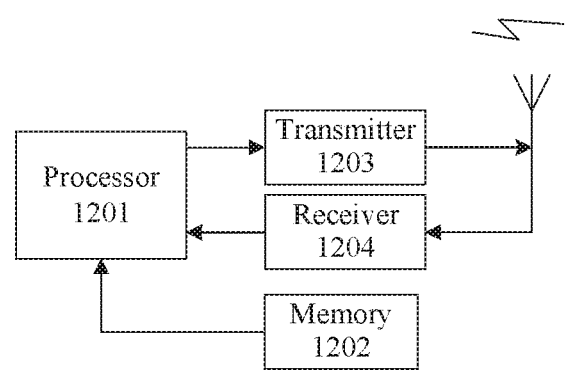
FIG. 12 is a structure block diagram of a wireless device according to an embodiment of this application.

The foregoing describes in detail the method for processing data according to the embodiments of this application with reference to FIG. 1 to FIG. 9, and the following describes a wireless device according to embodiments of this application with reference to FIG. 10 to FIG. 12.

FIG. 10 is a schematic block diagram of a wireless device 1000 according to an embodiment of this application. The wireless device 1000 is configured to perform steps in the foregoing method 500 or a related example. Optionally, modules in the wireless device 1000 may be implemented through software. The wireless device 1000 may be installed in a general-purpose computer device. As shown in FIG. 10, the wireless device 1000 includes:

a receiving module 1010, configured to receive a first protocol data unit; and a processing module 1020, configured to obtain a first count value of the first protocol data unit.

The processing module 1020 is further configured to: if the first count value matches a second count value maintained by the wireless device, deliver a service data unit corresponding to a second value set in a first value set to an upper layer protocol stack, and delete a fourth value set from a third value set, where the first value set includes a count value of a service data unit that is corresponding to a protocol data unit delivered in order and that the wireless device receives and stores in a receiving buffer; the third value set includes a count value, recorded by the wireless device, of a service data unit that is corresponding to a protocol data unit delivered out of order and that the wireless device receives and has delivered to the upper layer protocol stack; and a fifth value set including the second value set and the fourth value set is a continuous count value section for which counting starts from the first count value.

Optionally, the second count value is a larger one of a count value of a service data unit, corresponding to the last protocol data unit delivered in order, delivered by the wireless device to the upper layer protocol stack and a maximum value of count values, deleted by the wireless device, of service data units corresponding to protocol data units delivered out of order.

Optionally, that the first count value matches a second count value maintained by the wireless device is specifically:

the first count value is equal to the second count value plus 1.

Optionally, the processing module 1020 is specifically configured to determine the first count value based on a sequence number SN of the first protocol data unit and a hyper frame number HFN of the first protocol data unit.

Optionally, after delivering the service data unit corresponding to the second value set in the first value set to the upper layer protocol stack, and deleting the fourth value set from the third value set, the processing module 1020 is further configured to update the second count value to a maximum value of the fifth value set.

Optionally, the wireless device performs steps in the foregoing method by using a packet data convergence protocol PDCP layer of the wireless device, and the first protocol data unit is a PDCP packet data unit PDU.

Optionally, after receiving the first protocol data unit, the processing module 1020 is further configured to:

if the first protocol data unit is a protocol data unit delivered in order, store a service data unit corresponding the first protocol data unit to the receiving buffer; or if the first protocol data unit is a protocol data unit delivered out of order, deliver a service data unit corresponding to the first protocol data unit to the upper layer protocol stack, and record the first count value.

It should be understood that, the foregoing and other management operations and/or functions of the modules in the wireless device 1000 according to this embodiment of this application are intended to implement corresponding steps of the foregoing method 500, and therefore can also implement beneficial effects of the foregoing method embodiment. For brevity, details are not repeated herein.

It should be further understood that, in this embodiment of this application, the processing module may be implemented by a processor, and the receiving module may be implemented by a receiver.

FIG. 11 is a schematic block diagram of a wireless device 1100 according to an embodiment of this application. The wireless device 1100 is configured to perform steps in the foregoing method 800 or a related example. Optionally, modules in the wireless device 1100 may be implemented through software. The wireless device 1100 may be installed in a general-purpose computer device. As shown in FIG. 11, the wireless device 1100 includes:

a processing module 1110, configured to perform the following steps if a first timer expires and the first timer is started by the wireless device after the wireless device receives a protocol data unit whose count value is a first count value:

delivering, to an upper layer protocol stack, a stored service data unit corresponding to a protocol data unit whose count value is less than the first count value and that is delivered in order;

deleting a recorded count value, less than the first count value, of a service data unit that is corresponding to a protocol data unit delivered out of order and that has been delivered to the upper layer protocol stack;

delivering a service data unit corresponding to a second value set in a first value set to the upper layer protocol stack, and deleting a fourth value set from a third value set, where the first value set includes a count value of a service data unit that is corresponding to a protocol data unit delivered in order and that the wireless device receives and stores in a receiving buffer; the third value set includes a count value, recorded by the wireless device, of a service data unit that is corresponding to a protocol data unit delivered out of order and that the wireless device receives and has delivered to the upper layer protocol stack; and a fifth value set including the second value set and the fourth value set is a continuous count value section for which counting starts from the first count value.

Optionally, after delivering the service data unit corresponding to the second value set in the first value set to the upper layer protocol stack, and deleting the fourth value set from the third value set, the processing module 1110 is further configured to:

update a second count value maintained on the wireless device to a maximum value of the fifth value set, where the second count value is a larger one of a count value of a service data unit, corresponding to the last protocol data unit delivered in order, delivered by the wireless device to the upper layer protocol stack and a maximum value of count values, deleted by the wireless device, of service data units corresponding to protocol data units delivered out of order.

Optionally, the wireless device performs steps in the following method by using a PDCP layer of the wireless device, and the protocol data unit is a PDCP packet data unit PDU.

It should be understood that, the foregoing and other management operations and/or functions of the modules in the wireless device 1100 according to this embodiment of this application are intended to implement corresponding steps of the foregoing method 800, and therefore can also implement beneficial effects of the foregoing method embodiment. For brevity, details are not repeated herein.

It should be further understood that, the processing module in this embodiment of this application may be implemented by a processor.

FIG. 12 is a schematic structural diagram of a wireless device according to an embodiment of this application. As shown in FIG. 12, the wireless device includes a processor 1201 and a memory 1202, and the memory 1202 is configured to store a corresponding program and corresponding data, for being called by the processor 1201 to implement a corresponding function. The processor 1201 may call the program and data stored in the memory, to implement a function performed by the wireless device in each method embodiment of this application.

Further, the wireless device may further include a transmitter 1203 and a receiver 1204, configured to send and receive data. In an embodiment, the first protocol data unit received by the wireless device may be received by the receiver 1204 in the wireless device. In another embodiment, the first protocol data unit received by the wireless device may be forwarded (may be forwarded in a wired or wireless manner) to the wireless device after being received by a receiver of a device other than the wireless device. For example, the wireless device is a CU, a PDCP PDU received by the CU is forwarded through an F1 interface after being received by the DU.

The wireless device can perform any method performed by the wireless device in the embodiments of this application.

The method disclosed in the embodiments of this application may be applied to a processor or may be implemented by a processor. The processor may be an integrated circuit chip and has a signal processing capability. In an implementation process, steps in the foregoing methods can be implemented by using a hardware integrated logical circuit in the processor, or by using instructions in a form of software. The foregoing processor may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component; or may be a system on chip (System On Chip, SoC), a central processor unit (Central Processor Unit, CPU), a network processor (Network Processor, NP), a digital signal processing circuit (Digital Signal Processor, DSP), a microcontroller (Micro Controller Unit, MCU), a programmable controller (Programmable Logic Device, PLD), or another integrated chip. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory (Random Access Memory, RAM), a flash memory, a read-only memory (Read-Only Memory, ROM), a programmable read-only memory, an electrically erasable programmable memory, a register, or the like. The storage medium is located in the memory, and a processor reads instructions in the memory and completes the steps in the foregoing methods in combination with hardware of the processor.

It should be further understood that the memory mentioned in the embodiments of this application may be a volatile memory or a nonvolatile memory, or may include a volatile memory and a nonvolatile memory. The nonvolatile memory may be a read-only memory ROM, a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory RAM and may serve as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that, the memory described in this specification is intended to include but not be limited to these and any other memory of an appropriate type.

It should be further understood that, first, second, and various numerical numbers in this specification are only for differentiation for ease of description, and are not used to limit the scope of this application.

It should be further understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be further understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for processing data applied to a wireless device, the method comprising:
   receiving a first protocol data unit;
   obtaining a first count value of the first protocol data unit;
   identifying that the first count value matches a second count value maintained by the wireless device;
   delivering a first service data unit corresponding to a second value set in a first value set to an upper layer protocol stack, wherein the first value set comprises a third count value of a second service data unit that corresponds to a protocol data unit delivered in-order and that the wireless device receives and stores in a receiving buffer; and
   deleting a fourth value set from a third value set, wherein the third value set comprises a fourth count value, recorded by the wireless device, of a third service data unit that corresponds to a protocol data unit delivered out-of-order and that the wireless device receives and has delivered to the upper layer protocol stack,
   wherein a fifth value set comprising the second value set and the fourth value set is a continuous count value section for which counting starts from the first count value.

2. The method of claim 1, wherein the second count value is a larger one of a count value of a service data unit, corresponding to a last protocol data unit delivered in-order, delivered by the wireless device to the upper layer protocol stack and a maximum value of count values, deleted by the wireless device, of service data units corresponding to protocol data units delivered out-of-order, and wherein identifying that the first count value matches the second count value comprises identifying that the first count value is equal to the second count value plus one.

3. The method of claim 1, further comprising determining the first count value based on a sequence number (SN) of the first protocol data unit and a hyper frame number (HFN) of the first protocol data unit.

4. The method of claim 1, wherein after delivering the first service data unit to the upper layer protocol stack and deleting the fourth value set, the method further comprises updating the second count value to a maximum value of the fifth value set.

5. The method of claim 1, wherein after receiving the first protocol data unit, the method further comprises:
   identifying that the first protocol data unit is delivered in-order; and
   storing a fourth service data unit corresponding to the first protocol data unit to the receiving buffer.

6. The method of claim 1, further comprising setting a Packet Data Convergence Protocol (PDCP) layer of the wireless device, wherein the first protocol data unit is a PDCP packet data unit (PDU).

7. A method for processing data applied to a wireless device, the method comprising:
   receiving a first protocol data unit that comprises a first count value;
   starting a first timer after receiving the first protocol data unit;
   identifying that the first timer expires;
   delivering, to an upper layer protocol stack, a stored service data unit corresponding to a protocol data unit comprising a second count value that is less than the first count value and that is delivered in-order;
   deleting a recorded count value, less than the first count value, of a first service data unit that corresponds to a first protocol data unit delivered out-of-order and that has been delivered to the upper layer protocol stack;
   delivering a second service data unit corresponding to a second value set in a first value set to the upper layer protocol stack, wherein the first value set comprises a third count value of a third service data unit that corresponds to a second protocol data unit delivered in-order and that the wireless device receives and stores in a receiving buffer; and
   deleting a fourth value set from a third value set,
   wherein the third value set comprises a fourth count value, recorded by the wireless device, of a fourth service data unit that corresponds to a third protocol data unit delivered out-of-order and that the wireless device receives and has delivered to the upper layer protocol stack, and
   wherein a fifth value set comprising the second value set and the fourth value set is a continuous count value section for which counting starts from the first count value.

8. The method of claim 7, wherein after delivering the second service data unit and deleting the fourth value set, the method further comprises updating a fifth count value maintained on the wireless device to a maximum value of the fifth value set, wherein the fifth count value is a larger one of a count value of a service data unit, corresponding to a last protocol data unit delivered in-order, delivered by the wireless device to the upper layer protocol stack and a maximum value of count values, deleted by the wireless device, of service data units corresponding to protocol data units delivered out-of-order.

9. The method of claim 7, further comprising setting a Packet Data Convergence Protocol (PDCP) layer of the wireless device, and wherein the first protocol data unit is a PDCP packet data unit (PDU).

10. A wireless device, comprising:
 a receiver configured to receive a first protocol data unit; and
 a processor coupled to the receiver and configured to:
  obtain a first count value of the first protocol data unit;
  identify that the first count value matches a second count value maintained by the wireless device;
  deliver a first service data unit corresponding to a second value set in a first value set to an upper layer protocol stack, wherein the first value set comprises a third count value of a second service data unit that corresponds to a protocol data unit delivered in-order and that the wireless device receives and stores in a receiving buffer; and
  delete a fourth value set from a third value set, wherein the third value set comprises a fourth count value, recorded by the wireless device, of a third service data unit that corresponds to a protocol data unit delivered out-of-order and that the wireless device receives and has delivered to the upper layer protocol stack, and
  wherein a fifth value set comprising the second value set and the fourth value set is a continuous count value section for which counting starts from the first count value.

11. The method of claim 1, wherein after receiving the first protocol data unit, the method further comprises:
 identifying that the first protocol data unit is delivered out-of-order;
 delivering a fourth service data unit corresponding to the first protocol data unit to the upper layer protocol stack; and
 recording the first count value.

12. The method of claim 7, further comprising determining the first count value based on a sequence number (SN) of the first protocol data unit and a hyper frame number (HFN) of the first protocol data unit.

13. The method of claim 7, wherein after receiving the first protocol data unit, the method further comprises:
 identifying that the first protocol data unit is delivered in-order; and
 storing a fifth service data unit corresponding to the first protocol data unit to the receiving buffer.

14. The method of claim 7, wherein after receiving the first protocol data unit, the method further comprises:
 identifying that the first protocol data unit is delivered out-of-order;
 delivering a fifth service data unit corresponding to the first protocol data unit to the upper layer protocol stack; and
 recording the first count value.

15. The wireless device of claim 10, wherein the second count value is a larger one of a count value of a service data unit, corresponding to a last protocol data unit delivered in-order, delivered by the wireless device to the upper layer protocol stack and a maximum value of count values, deleted by the wireless device, of service data units corresponding to protocol data units delivered out-of-order, and wherein when identifying that the first count value matches the second count value, the processor is further configured to identify that the first count value is equal to the second count value plus one.

16. The wireless device of claim 10, wherein the processor is further configured to determine the first count value based on a sequence number (SN) of the first protocol data unit and a hyper frame number (HFN) of the first protocol data unit.

17. The wireless device of claim 10, wherein after delivering the first service data unit corresponding to the second value set to the upper layer protocol stack and deleting the fourth value set, the processor is further configured to update the second count value to a maximum value of the fifth value set.

18. The wireless device of claim 10, wherein after receiving the first protocol data unit, the processor is further configured to:
 identify that the first protocol data unit is delivered in-order; and
 store a fourth service data unit corresponding to the first protocol data unit to the receiving buffer.

19. The wireless device of claim 10, wherein the processor is further configured to set a packet data convergence protocol (PDCP) layer of the wireless device, and wherein the first protocol data unit is a PDCP packet data unit (PDU).

20. The wireless device of claim 10, wherein after receiving the first protocol data unit, the processor is further configured to:
 identify that the first protocol data unit is delivered out-of-order;
 deliver a fourth service data unit corresponding to the first protocol data unit to the upper layer protocol stack; and
 record the first count value.

* * * * *

UNITED STATES PATENT AND TRADEMARK OFFICE
CERTIFICATE OF CORRECTION

PATENT NO. : 11,025,555 B2  
APPLICATION NO. : 16/633398  
DATED : June 1, 2021  
INVENTOR(S) : Xiaoxian Li et al.

Page 1 of 1

It is certified that error appears in the above-identified patent and that said Letters Patent is hereby corrected as shown below:

On the Title Page

Page 2, Item (56) References Cited, Other Publications: "7 Lg Electronics Inc, "Support for out-of-order delivery in Pdcp," XP051330415, R21709872, 3GPP Tsg-Ran"" should read "LG Electronics Inc, "Support for out-of-order delivery in PDCP," XP051330415, R21709872, 3GPP TSG-RAN"

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*